US009236934B1

(12) United States Patent
Hudson (10) Patent No.: US 9,236,934 B1
(45) Date of Patent: Jan. 12, 2016

(54) SATELLITE SYSTEM ARCHITECTURE FOR COVERAGE AREAS OF DISPARATE DEMAND

(75) Inventor: Erwin C. Hudson, Centennial, CO (US)

(73) Assignee: VIASAT, INC., Carlsbad, CA (US)

( * ) Notice: Subject to any disclaimer, the term of this patent is extended or adjusted under 35 U.S.C. 154(b) by 1325 days.

(21) Appl. No.: 12/906,869

(22) Filed: Oct. 18, 2010

Related U.S. Application Data

(60) Provisional application No. 61/252,586, filed on Oct. 16, 2009.

(51) Int. Cl.
*H04W 4/00* (2009.01)
*H04B 7/185* (2006.01)

(52) U.S. Cl.
CPC ............ *H04B 7/185* (2013.01); *H04B 7/18576* (2013.01)

(58) Field of Classification Search
CPC ...... H04B 7/185; H04B 7/18527; H04W 4/00
USPC .................................. 370/317, 316
See application file for complete search history.

(56) References Cited

U.S. PATENT DOCUMENTS

| | | | |
|---|---|---|---|
| 3,896,382 A | 7/1975 | Magenheim | |
| 4,232,321 A | 11/1980 | Ohm | |
| 4,287,598 A | 9/1981 | Langseth et al. | |
| 4,689,625 A | 8/1987 | Barmat | |
| 4,985,689 A | 1/1991 | Kadowaki et al. | |
| 5,355,512 A | 10/1994 | Profera, Jr. | |
| 5,408,237 A | 4/1995 | Patterson et al. | |
| 5,448,621 A | 9/1995 | Knudsen | |
| 5,473,601 A | 12/1995 | Rosen et al. | |
| 5,504,465 A | 4/1996 | Yung et al. | |
| 5,511,233 A | 4/1996 | Otten | |
| 5,574,968 A | 11/1996 | Olds et al. | |
| 5,574,969 A | 11/1996 | Olds et al. | |
| 5,613,194 A | 3/1997 | Olds et al. | |

(Continued)

FOREIGN PATENT DOCUMENTS

| | | |
|---|---|---|
| WO | WO 01/59961 | 8/2001 |
| WO | WO 02/09318 | 1/2002 |

(Continued)

OTHER PUBLICATIONS

Agrawal, Brij N., Design of Geosynchronous Spacecraft, ISBN 0-13-200114-4, 1986, Prentice-Hall, 6 pgs.
(Continued)

*Primary Examiner* — Gregory Sefcheck
*Assistant Examiner* — Majid Esmaeilian
(74) *Attorney, Agent, or Firm* — Holland & Hart LLP (57) ABSTRACT

Disclosed is a satellite communication system that allocates bandwidth to maximize the capacity of the communication system while providing service to geographical areas having different demands. A smaller portion of the frequency spectrum can be allocated for subscriber beams that supply service to low demand areas. A larger portion of the frequency spectrum can be provided to subscriber beams that provide access to high demand areas. Allocation of bandwidth can be determined by the amount of demand in low demand areas versus the amount of demand in high demand areas. High demand gateways are physically located in low demand subscriber beams, while low demand gateways are physically located in high demand subscriber beams, which prevents interference.

32 Claims, 9 Drawing Sheets

(56) References Cited

U.S. PATENT DOCUMENTS

| | | | |
|---|---|---|---|
| 5,826,190 | A | 10/1998 | Krutz et al. |
| 5,894,590 | A | 4/1999 | Vatt et al. |
| 5,926,547 | A | 7/1999 | Heieis et al. |
| 5,926,758 | A | 7/1999 | Grybos et al. |
| 5,943,608 | A | 8/1999 | Sherman |
| 6,006,113 | A | 12/1999 | Meredith |
| 6,070,073 | A | 5/2000 | Maveddat et al. |
| 6,169,513 | B1 | 1/2001 | Cohen |
| 6,173,178 | B1 | 1/2001 | Hammill et al. |
| 6,198,435 | B1 | 3/2001 | Reudink et al. |
| 6,219,546 | B1 | 4/2001 | Valentine et al. |
| 6,301,465 | B1 | 10/2001 | Kintis et al. |
| 6,311,128 | B1 | 10/2001 | Prum et al. |
| 6,314,269 | B1 | 11/2001 | Hart et al. |
| 6,374,104 | B1 | 4/2002 | Croq et al. |
| 6,466,569 | B1 | 10/2002 | Wright et al. |
| 6,571,081 | B1 | 5/2003 | Reinhardt |
| 6,725,013 | B1 | 4/2004 | Chang et al. |
| 6,751,458 | B1 | 6/2004 | Wang et al. |
| 6,781,968 | B1 | 8/2004 | Colella et al. |
| 6,788,917 | B1 | 9/2004 | Refai et al. |
| 6,813,492 | B1 | 11/2004 | Hammill et al. |
| 6,850,732 | B2 | 2/2005 | Patterson et al. |
| 6,850,764 | B1 * | 2/2005 | Patel ............................ 455/450 |
| 6,892,068 | B2 | 5/2005 | Karabinis et al. |
| 6,898,428 | B2 | 5/2005 | Thorburn et al. |
| 6,941,119 | B2 | 9/2005 | Wilson et al. |
| 6,944,450 | B2 | 9/2005 | Cox |
| 6,993,288 | B2 | 1/2006 | De La Chapelle et al. |
| 7,031,653 | B1 | 4/2006 | Turley et al. |
| 7,068,971 | B2 | 6/2006 | Abutaleb et al. |
| 7,149,526 | B2 | 12/2006 | Karabinis et al. |
| 7,177,592 | B2 | 2/2007 | Jarett |
| 7,200,360 | B1 | 4/2007 | Chang et al. |
| 7,599,657 | B2 | 10/2009 | Schiff |
| 7,609,666 | B2 | 10/2009 | Karabinis |
| 7,620,394 | B2 | 11/2009 | Good et al. |
| 7,747,229 | B2 | 6/2010 | Dutta |
| 7,792,070 | B1 | 9/2010 | Burr |
| 7,912,931 | B2 | 3/2011 | Ahmed et al. |
| 8,032,073 | B2 | 10/2011 | Youssefzadeh et al. |
| 2002/0013149 | A1 | 1/2002 | Threadgill et al. |
| 2003/0050008 | A1 | 3/2003 | Patterson et al. |
| 2003/0054814 | A1 | 3/2003 | Karabinis et al. |
| 2003/0073436 | A1 | 4/2003 | Karabinis et al. |
| 2003/0134592 | A1 | 7/2003 | Franzen et al. |
| 2004/0023658 | A1 | 2/2004 | Karabinis et al. |
| 2004/0072561 | A1 | 4/2004 | LaPrade |
| 2004/0139473 | A1 | 7/2004 | Greene |
| 2005/0118947 | A1 | 6/2005 | Ames et al. |
| 2005/0164701 | A1 | 7/2005 | Karabinis et al. |
| 2005/0181786 | A1 | 8/2005 | Karabinis et al. |
| 2005/0197060 | A1 | 9/2005 | Hedinger et al. |
| 2005/0226185 | A1 | 10/2005 | Tell et al. |
| 2005/0272369 | A1 | 12/2005 | Karabinis et al. |
| 2005/0282542 | A1 | 12/2005 | Karabinis |
| 2005/0288011 | A1 * | 12/2005 | Dutta ............................ 455/427 |
| 2006/0205347 | A1 | 9/2006 | Karabinis |
| 2006/0211419 | A1 | 9/2006 | Karabinis |
| 2006/0276129 | A1 | 12/2006 | Karabinis |
| 2007/0026867 | A1 | 2/2007 | Karabinis |
| 2008/0146145 | A1 | 6/2008 | Pateros et al. |
| 2009/0081946 | A1 | 3/2009 | Dankberg et al. |
| 2009/0286467 | A1 | 11/2009 | Miller |
| 2009/0290530 | A1 | 11/2009 | Dankberg et al. |
| 2009/0291633 | A1 | 11/2009 | Dankberg et al. |
| 2009/0295628 | A1 | 12/2009 | Wilson et al. |
| 2011/0007686 | A1 | 1/2011 | Burr |

FOREIGN PATENT DOCUMENTS

| | | |
|---|---|---|
| WO | WO 2004/010610 | 1/2004 |
| WO | WO 2005/029729 | 3/2005 |
| WO | WO 2006/012348 | 2/2006 |
| WO | WO 2006/099443 | 9/2006 |

OTHER PUBLICATIONS

Alberty, Eric et al., Adaptive Coding and Modulation for the DVB-S2 Standard Interactive Applications: Capacity Assessment and Key System Issues, IEEE Wireless Communications, Aug. 2007, pp. 2-11.

Asato, Michael S. et al., A High-Capacity, Anti-Jam EHF "Bent-Pipe" Satellite/Central-Hub System Architecture Concept, IEEE Paper No. 0-7803-2489-7/95, The Aerospace Corporation, Los Angeles, CA, Jul. 1995, pp. 722-730.

Berk, G. et al., An FDMA System Concept for 30-20 GHz High Capacity Domestic Satellite Service, AIAA Paper No. 82-0447, The MITRE Corporation, $9^{th}$ AIAA Satellite Systems Conference, Mar. 1982, pp. 65-71.

Berk, G., A Frequency-Division Multiple-Access System Concept for 30/20 GHz High-Capacity Domestic Satellite Service, J. Spacecraft, 1983, vol. 20, No. 6, pp. 619-625.

Berk, G. et al., Final Technical Report On-Board Processing for Future Satellite Communications Systems: Satellite-Routed FDMA, NASA Report CR-165419, MITRE Technical Report MTR-8311, May 1981, 291 pgs.

Board, John E., A Concept for a 30/20 GHz International Business/Digital Services Satellite System for the Atlantic Ocean Region, AIAA, 1984, pp. 147-148.

contactMEO Communications, LLC, FCC Application for Space and Earth Station, File No. SAT-AMD-20040317-00035, Mar. 17, 2004, 115 pgs.

contactMEO Communications, LLC, FCC Additional Information Filing, File No. SAT-AMD-20040719-00141, Jul. 19, 2004, 43 pgs.

Das, Annapunna et al., Microwave Engineering, ISBN-0-07-463577-8, 2000, p. 190, Tata McGraw-Hill Publishing Company Limited, India.

Doro, G. et al., Beam Forming Network for a Multibeam Antenna at 20GHz, IEEE Paper, 1984, pp. 691-696.

Echostar Satellite Corporation, Petition for Rulemaking to Redesignate the Non-Geostationary Fixed-Satellite Service Operations on a Co-Primary Basis, Aug. 27, 2003, 21 pgs.

Elbert, Bruce R., Introduction to Satellite Communication, $2^{nd}$ Edition, Artech House Inc., International Standard Book No. 0-89006-961-1, Library of Congress Catalog Card No. 98-44783, 1999, 7 pgs.

Elizondo, Eduardo et al., Lockheed Martin Telecommunications, Astrolink™ Satellite System Overview, IEEE, 1998, pp. 539-546.

Evans, B. G., Satellite Communication Systems, $3^{rd}$ Edition, The Institution of Electrical Engineers, 1999, 8 pgs.

Evans, J.V., Communication Satellite Systems for High-Speed Internet Access, IEEE Antennas and Propagation Magazine, vol. 43, No. 5, Oct. 2001, pp. 11-22.

Federal Communications Commission, Third Report and Order, Cc Docket No. 92-297, Adopted Oct. 9, 1997, Released 15 Oct. 1997, 22 pgs.

Federal Communications Commission, Report and Order—Further Notice of Proposed Rulemaking, FCC 02-123, IB Docket No. 01-96, Released Apr. 26, 2002, 43 pgs.

Federal Communications Commission, Report and Order, FCC 03-137, IB Docket No. 02-19, Released Jul. 9, 2003, 25 pgs.

Gedney, Richard T. et al., The Advanced Communications Technology Satellite: An Insider's Account of the Emergence of Interactive Broadband Technology in Space, SciTech Pub., 2001, 6 pgs.

Gehring, R. et al., Trade-Off for Overlapping Feed Array Configurations, $29^{th}$ ESA Antenna Workshop on Multiple Beams and Reconfigurable Antennas, Apr. 18-20, 2007 at ESTEC, Noordwijk, the Netherlands, 4 pgs.

Gelly, A., Planning Feeder Links to Broadcasting Satellites, $10^{th}$ Communication Satellite Systems Conference in Orlando, FL, AIAA, 1984, 3 pgs.

(56) References Cited

OTHER PUBLICATIONS

Globalstar, Description of the Globalstar System, GS-TR-94/0001, Revision E, Dec. 7, 2000, 116 pgs.
Gordon, Gary D. et al., Principles of Communications Satellites, John Wiley & Sons, Inc., Library of Congress IBSN 0-471-55796-X, 1993, 16 pgs.
Hogg, David C. et al., The Role of Rain in Satellite Communications, Proceedings of the IEEE, Sep. 1975, 63(9):1308-1331.
ICAO, ICAO Technical Manual for Iridium Aeronautical Mobile Satellite (Route) Service, Draft v1.1, May 19, 2006, 48 pgs.
Jorasch, Ronald E., Advanced Satellite System Architecture for VSATs with ISDN Compatibility, $12^{th}$ AIAA ICSSC, Mar. 13-17, 1988, 10 pgs.
Kawakami, Yoichi et al., Study on S-Band Mobile Communications Systems Using a Geostationary Satellite, $17^{th}$ AIAA ICSS Conference and Exhibit, AIAA-1998-1212, AIAA, 1998, pp. 1-7.
Lier, Eric et al., Techniques to Maximize Communication Traffic Capacity in Multi-Beam Satellite Active Phased Array Antennas for Non-Uniform Traffic Model, Lockheed Martin Communications and Power Center, IEEE Paper No. 0-7803-6345-0/00, 2000, pp. 505-508.
Lockheed Martin Corporation, Application of Lockheed Martin Corporation for a Global Q/V-Band Satellite Communications System, Sep. 24, 1997, 396 pgs.
Lockheed Martin Corporation, Application of Lockheed Martin Corporation for Authority to Launch and Operate a Global Satellite Communications System in Geostationary Orbit, Dec. 22, 1997, 186 pgs.
Logsdon, Tom, Mobile Communication Satellites, McGraw-Hill Inc., IBSN 0-07-038476-2, 1995, 4 pgs.
Loral Space & Communications Ltd., Application for Authority to Launch and Operate "CyberPath198 ," Communications Satellites in the Fixed-Satellite Service, Sep. 1997, 159 pgs.
Maral, Gérard, VSAT Networks, $2^{nd}$ Edition, John Wiley & Sons, Ltd, IBSN 0-470-86684-5, 1995 & 2003, 8 pgs.
Maral, Gérard et al., Satellite Communications Systems: Systems, Techniques and Technology, $4^{th}$ Ed., John Wiley & Sons, May 2002, pp. 242-245 and pp. 473-482.
Martin, Donald H., Communication Satellites, 4th Ed., IBSN 1-884989-09-8, The Aerospace Corporation, USA, 2000, pp. 46, 244, 246, and 265.
Miller, Michael J. et al., Satellite Communications Mobile and Fixed Services, Kluwer Academic Publishers, IBSN 0-7923-9333-3, 1993, 5 pgs.
Mitra, Monojit, Satellite Communication, PHI Learning Private Limited, IBSN 978-81-203-2786-3, 2005, $6^{th}$ Printing, Dec. 2010, 4 pgs.
Naderi, F. Michael et al., NASA's Advanced Communications Technology Satellite (ACTS): An Overview of the Satellite, The Network, and the Underlying Technologies, $12^{th}$ AIAA ICSSC, Mar. 13-17, 1988, pp. 204-224.
Nakahira, Katsuya et al., NTT, Communication Capacity and Quality Enhancement Using a Two-Layered Adaptive Resource Allocation Scheme for Multi-Beam Mobile Satellite Communication Systems, IEICE Trans. Fundamentals, Jul. 7, 2006, vol. E89-A, No. 7, pp. 1930-1938.
Nakahira, Katsuya et al., Ntt, A Resource Allocation Scheme for QoS Provision in Multi-Beam Mobile Satellite Communication Systems, IEEE, 2007, pp. 4011-4015.
Nakasuga, Yoshinori et al., NTT, Communication Capacity Enhancement with Adaptive Resource Assignment for Multi-Beam Mobile Satellite Communication Systems, $22^{nd}$ AIAA International Communications Satellite Systems Conference & Exhibit 2004, May 9-12, 2004, 13 pgs.
National Aeronautics and Space Administration, Charles T. Force, Comments of the National Aeronautics and Space Administration, CC Docket No. 92-297, Aug. 28, 1995, 25 pgs.
Newscom.com, Senator Ted Stevens Officiates at New Iridium Satellite Ground Station in Alaska, Aug. 2006, http://www.prnewswire.com/news-releases/senator-ted-stevens-officiates-at-new-iridium-satellite-ground-station-in-alaska-56260797.html, PR Newswire, 2 pgs.
Northrop Grumman Space Technology and Mission Systems Corporation, Comments of Northrop Grumman Space Technology and Mission Systems Corporation, Oct. 27, 2003, 26 pgs.
Northrop Grumman Space Technology and Mission Systems Corporation, Amendment to Application for Authority to Operate a Geostationary Satellite in the Fixed-Satellite Service, File No. SAT-LOA-19970904-00082, Mar. 11, 2004, 91 pgs.
Northrop Grumman Space & Mission Systems Corp., Supplement to FCC Amendment, File No. SAT-AMD-2004719-00138, Jul. 19, 2004, 50 pgs.
O'Brien, John R. "Ted," Mobile Satellite Communications for Disaster Management, United Nations Workshop on Disaster Management, Feb. 2006, Iridium Satellite LLC, 18 pgs.
Ohata, Kohei et al., Broadband and Scalable Mobile Satellite Communication System for Future Access Networks, Acta Astronautica, vol. 57, 2005, pp. 239-249.
Pratt, Timothy et al., Satellite Communications, John Wiley & Sons, IBSN 0-471-87837-5, 1986, 8 pgs.
Price, Kent M. et al., Data Distribution Satellite System Architecture Concept, $13^{th}$ AIAA ICSS Conference and Exhibit, AIAA-90-0885-CP, AIAA, Mar. 1990, pp. 864-876.
Pritchard, Wilbur L. et al., Satellite Communication Systems Engineering, $2^{nd}$ Edition, Prentice-Hall, Inc., IBSN 0-13-791468-7, 1993, 7 pgs.
Ramler, James R. et al., Concept for Advanced Satellite Communications and Required Technologies, Prepared for the 1982 National Telesystems Conference sponsored by the Institute of Electrical and Electronic Engineers, Nov. 7-10, 1982, 12 pgs.
Rao, K. N. Raja, Fundamentals of Satellite Communication, PHI Learning Private Limited, 2009, 5 pgs.
Reudink, Douglas O. et al., The Transmission Capacity of Multibeam Communication Satellites, Proceedings of the IEEE, vol. 69, No. 2, Feb. 1981, pp. 209-225.
Rinaldo, Rita et al., Capacity Analysis and System Optimization for the Forward Link of Multi-beam Satellite Broadband Systems Exploiting Adaptive Coding and Modulation, Int. J. Satell. Commun. Network, Mar. 2004, 22:401-423.
Roddy, Dennis, Satellite Communications, $3^{rd}$ Edition, McGraw-Hill, IBSN 0-07-137176-1, 2001, 6 pgs.
Rusch, R. J. et al., Intelsat V Spacecraft Design Summary, A Collection of Technical Papers, AIAA $7^{th}$ Communications Satellite Systems Conference, San Diego, California/Apr. 24-27, 1978, pp. 8-20.
Sagawa, Yuichi et al., A Satellite Resource Allocation for Multi-Beam Satellite Communication System, IEICE Technical Report, SAT2003-125 (Oct. 2003), 103(386): 2003, pp. 19-24.
Sagawa, Yuichi et al., NTT, A Study on Multi-Beam Allocation for Next Generation Mobile Satellite Communication System, IEICE General Conference 2004, 3 pgs.
Skinnemoen, Harald, Gateway Diversity in Ka-Band Systems, Nera SatCom, Proceedings of the $4^{th}$ Ka-Band Utilization Conference, 1998, 8 pgs.
Skybridge II L.L.C., FCC Application for Authority to Launch and Operate the SkyBridge II System, 58-SAT-P/LA-98(96), Dec. 22, 1997, 253 pgs.
Skybridge, L.P., FCC Ex Parte Submission, Ex Parte File Nos. 48-SAT-P/LA-97, 89-SAT-AMEND-97, 130-SAT-AMEND-98, ET Docket No. 98-206, Feb. 1, 2002, 36 pgs.
Spilker, James J. Jr. et al., Digital Communications by Satellite, Prentice-Hall, Inc., IBSN 0-13-214155-8, 1977, 5 pgs.
The Institute of Electrical and Electronics Engineering, IEEE 100: The Authoritative Dictionary of IEEE Standards Terms, 7th Ed., IEEE, ISBN 0-7381-2601-2, 2000, pp. 852 and 1087.
Van Trees, H. L. et al., Planning for the Post-1985 INTELSAT System, AIAA $7^{th}$ Communications Satellite Systems Conference, San Diego, California, Apr. 24-27, 1978, pp. 43-54.
Wiedeman, R.A., A High Capacity Mobile Communications Satellite System for the First Generation MSS, Ford Aerospace & Communications Corporation, AIAA-86-0658, AIAA, 1986, pp. 375-380.
"Defendant Space Systems/Loral, Inc.'s Answer, Affirmative Defenses and Counterclaims to Plaintiffs' Second Amended Com-

(56) References Cited

OTHER PUBLICATIONS plaint for Patent Infringement and Breach of Contract," *ViaSat, In2c., et al.* v. *Space Systems/Loral, Inc., et al*, Case No. 3:12-cv-00260-H-WVG, U.S. District Court Southern District of California, filed Jun. 15, 2012, 55 pgs.

"Defendant Space Systems/Loral, Inc.'s First Amended Answer, Affirmative Defenses and Counterclaims to Plaintiffs' Second Amended Complaint for Patent Infringement and Breach of Contract," *ViaSat, Inc., et al.* v. *Space Systems/Loral, Inc., et al*, Case No. 3:12-CV-00260-H-WVG, U.S. District Court Southern District of California, filed Jul. 6, 2012, 56 pgs.

"Plaintiffs Viasat, Inc. and Viasat Communications, Inc.'S Answer, Defenses, and Counter Counterclaims to Defendant Space Systems/Loral, Inc.'S Counterclaims," *ViaSat, Inc., et al.*, v. *Space Systems/Loral, Inc., et al.*, Case No. 3:12-cv-00260-H-WVG, U. S. District Court Southern District of California; filed Jul. 20, 2012, 27 pgs.

"Defendant Space Systems/Loral, Inc.'S Answer and Affirmative Defenses to Plaintffs' Counter Counterclaims," *ViaSat, Inc., et al.* v. *Space Systems/Loral, Inc., et al.*, Case No. 3:12-cv-00260-H-WVG, U.S. District Court Southern District of California; filed Aug. 10, 2012, 7 pgs.

"Plaintiffs' Disclosure of Asserted Claims and Preliminary Infringement Contentions Pursuant to Patent L.R. 3.1," *ViaSat, Inc., et al.* v. *Space Systems/Loral, Inc., et al.*, Case No. 3:12-cv-00260-H-WVG, U.S. District Court Southern District of California, filed Sep. 5, 2012, 118 pgs.

"Defendant Loral Space & Communications Inc.'s Answer, Affirmative Defenses and Counterclaims to Plaintiffs' Second Amended Complaint for Patent Infringement and Breach of Contract," *ViaSat, Inc., et al.* v. *Space Systems/Loral, Inc.*, Case No. 3:12-CV-00260-H-WVG, U.S. District Southern District of California, filed Aug. 29, 2012, 46 pgs.

"Plaintiffs Viasat, Inc. and Viasat Communications, Inc.'s Answer and Defenses to Defendant Loral Space & Communication'S Counterclaims," Case No. 3:12-cv-00260-H-WVG, U.S. District Southern District of California, filed Sep. 19, 2012, 14 pgs.

\* cited by examiner

SATELLITE SYSTEM ARCHITECTURE FOR COVERAGE AREAS OF DISPARATE DEMAND

CROSS-REFERENCE TO RELATED APPLICATION

The present application is based upon and claims the benefit of U.S. provisional application Ser. No. 61/252,586, filed Oct. 16, 2009, by Erwin C. Hudson, entitled "Satellite System Architecture for Coverage Areas of Disparate Demand." The entire content of this application is hereby specifically incorporated herein by reference for all it discloses and teaches.

BACKGROUND OF THE INVENTION

Communication satellites have become extremely important, not only for military purposes but also for commercial purposes. Satellites, such as the WildBlue Communications, Inc. Anik F2 satellite and the WildBlue-1 satellite, provide broadband Internet access to numerous subscribers throughout the satellite coverage area, including subscribers in rural and remote areas that may be unserved by terrestrial systems.

SUMMARY OF THE INVENTION

An embodiment of the present invention may therefore comprise a method of providing satellite communication services using an allocated frequency spectrum having a predetermined bandwidth in a satellite communication system that has multiple beams covering high demand areas and low demand areas comprising: allocating a first percentage of the predetermined bandwidth as a low demand frequency spectrum for use in low demand subscriber beams and low demand gateway beams so that the low demand area is provided with a low demand subscriber capacity that corresponds to the first percentage of the predetermined bandwidth allocated as the low demand frequency spectrum; allocating a second percentage of bandwidth as a high demand frequency spectrum for use in high demand subscriber beams and high demand gateway beams so that the high demand area is provided with a high demand subscriber capacity that corresponds to the second percentage of the predetermined bandwidth allocated as the high demand frequency spectrum; directing the low demand subscriber beams to the low demand areas; directing the high demand subscriber beams to the high demand areas; directing the low demand gateway beams to low demand gateways located in the high demand areas which reduces interference between the low demand gateway beams having the low demand frequency spectrum and the high demand subscriber beams having a high demand frequency spectrum that is different from the low demand frequency spectrum; directing the high demand gateway beams to high demand gateways located in the low demand areas which reduces interference between the high demand gateway beams, having the high demand frequency spectrum, and the low demand subscriber beams, having a low demand frequency spectrum that is different from the high demand frequency spectrum.

The present invention may further comprise a satellite communication system using an allocated frequency spectrum having a predetermined bandwidth that provides satellite communication services to high demand areas and low demand areas comprising: a plurality of low demand subscriber beam antennas that direct low demand subscriber beams to low demand geographical areas, the low demand subscriber beams using a low demand frequency spectrum which is a first percentage of the predetermined bandwidth; a plurality of high demand subscriber beam antennas that direct high demand subscriber beams to high demand geographical areas, the high demand subscriber beams using a high demand frequency spectrum which is a second percentage of the predetermined bandwidth; at least one low demand gateway beam antenna that directs a low demand gateway beam to a low demand gateway located in the high demand geographical area to reduce interference between the low demand gateway beam, using the low demand frequency spectrum, and the high demand subscriber beams, using the high demand frequency spectrum; at least one high demand gateway beam antenna that directs a high demand gateway beam to a high demand gateway that is located in the low demand geographical area to reduce interference between the high demand gateway beam, using the high demand frequency spectrum, and the low demand subscriber beams, using the low demand frequency spectrum.

DETAILED DESCRIPTION OF THE EMBODIMENTS

Figure 1A:
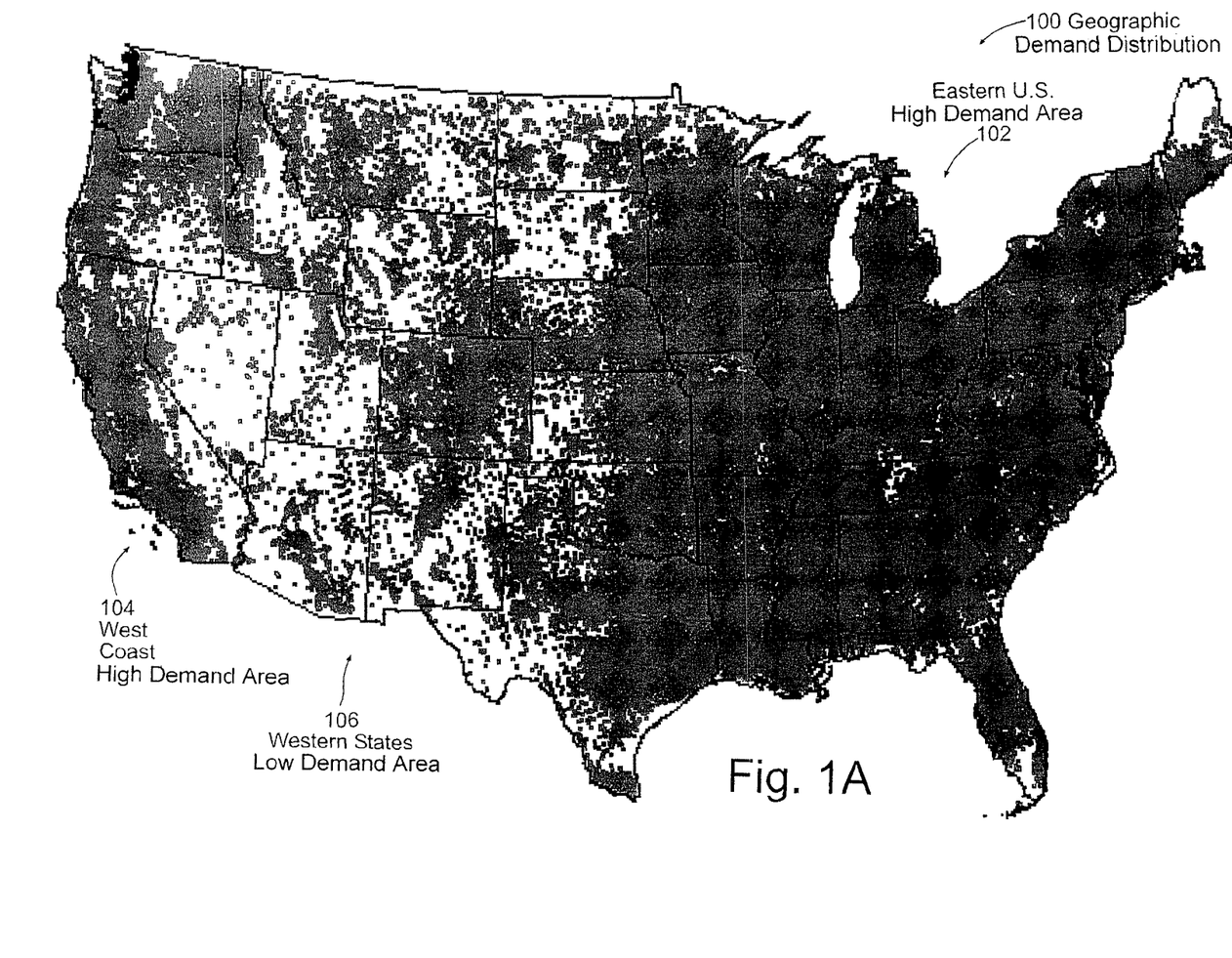
FIG. 1A is a graphical representation of a typical geographical demand distribution of satellite communication services for broadband Internet access in the United States.
Figure 1B:
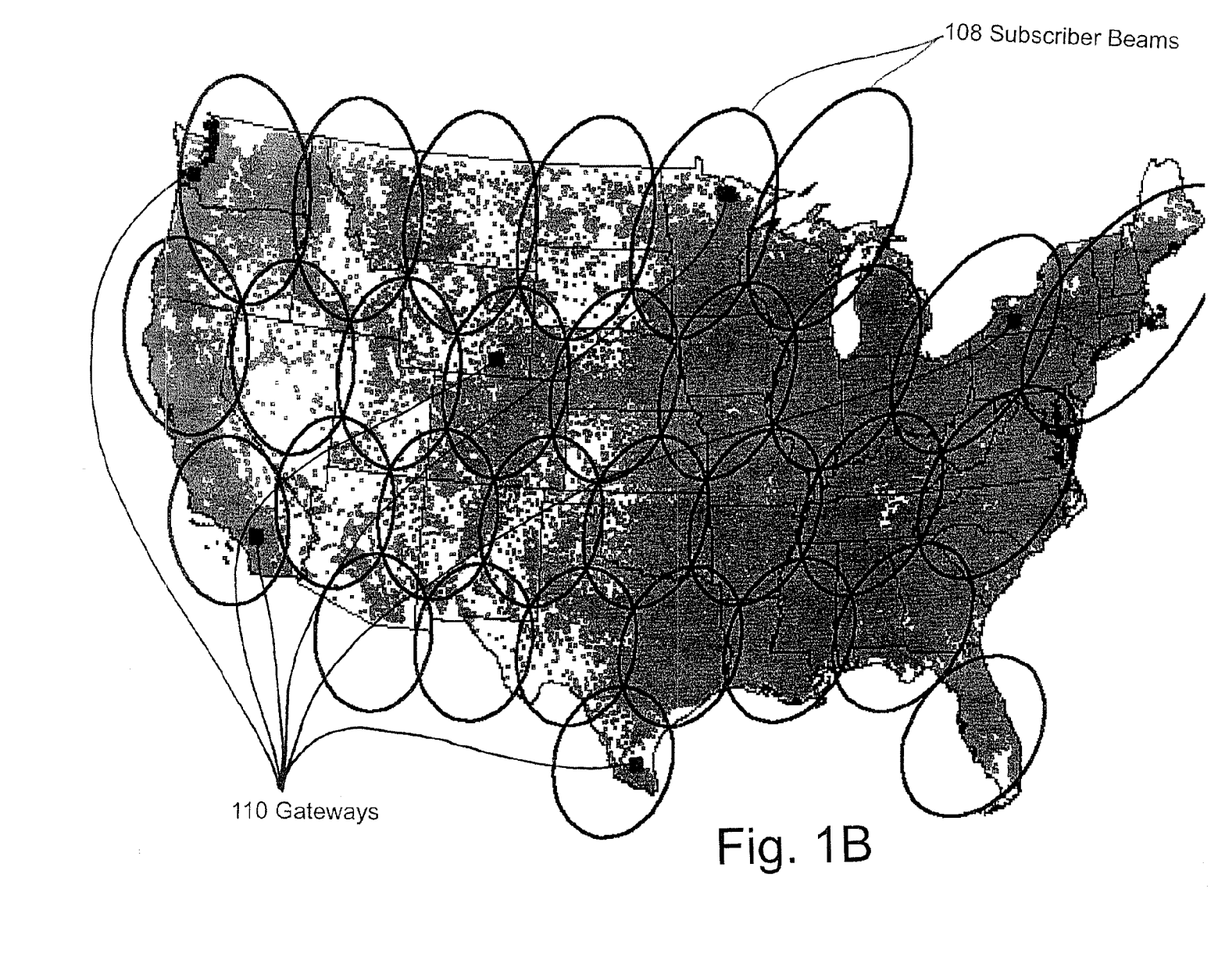
FIG. 1B is a graphical representation of subscriber beams and gateways disposed over the United States for a typical satellite communication system.

FIG. 1 is a schematic illustration of a typical geographical demand distribution of subscribers of broadband Internet services provided by a satellite communication system. The geographical demand distribution 100, illustrated in FIG. 1, is representative of the geographical demand distribution of the WildBlue 1 and WildBlue Anik F2 satellites that are currently being operated by WildBlue Communications, Inc., 5970 Greenwood Plaza Boulevard, Suite 300, Greenwood Village, Colo. 80111. As illustrated in FIG. 1, there are high demand areas, such as high demand area 102 in the Eastern United States, and high demand area 104 on the West Coast of the United States. Low demand area 106 is located in the Western States of the United States. As used in this patent, "high demand area" refers to the geographic areas served by a subscriber beams where comparatively more bandwidth utilization is desired or intended than in other areas (such other areas are referred to as "low demand areas."). Actual demand is not relevant with respect to the term "high demand area" or "low demand area," but rather refers to the desired bandwidth utilization. The WildBlue 1 satellite and the WildBlue Anik F2 satellite utilize a series of subscriber beams, such as subscriber beams 108, illustrated in FIG. 1B, that are approximately the same size and cover the entire geographical area of the United States, so that all of the geographical area of the contiguous United States has access to the WildBlue satellites. The subscriber beams 108, such as illustrated in FIG. 1 B, provide the same access to the low demand area 106 (Western States) as the high demand area 102, 104 (Eastern United States and West Coast).

As also illustrated in FIG. 1 B, gateway stations that send and receive microwave signals to and from a communication satellite, such as WildBlue 1 and WildBlue Anik F2 satellites, are dispersed throughout the United States and communicate with the satellite on a separate set of frequencies from the frequencies that are utilized by the satellite for the subscriber beams 108. For example, subscriber beams may utilize a first set of frequencies that may be referred to as frequency "Band A." The subscriber beams on Band A provide communication between the subscribers and the satellite. A second set of frequencies, "Band B," is used to communicate between the satellite and the gateways. Non-overlapping bands of frequencies, i.e., Band A and Band B, are used to prevent interference between the gateway communication signals and the subscriber beams, since the gateways are physically located within the geographical regions of the subscriber beams. Band A and Band B may include the total frequency spectrum that is allocated by the Federal Communications Commission or other regulatory authority that can be used by the satellite for communications to maximize the usage of the satellite communication system. Because of the high demand for high speed Internet communications and the limited frequency spectrum that is available, there is a limit to the number of subscribers that can be linked to the communication system, especially in high demand areas.

To increase capacity, ViaSat, Inc. has disclosed a satellite architecture in U.S. Patent Publication No. U.S. 2009/0081946, published Mar. 26, 2009 (U.S. application Ser. No. 12/187,051) (the "ViaSat '051 patent application") that discloses a system in which services are only provided to high demand area 102 (Eastern United States) and high demand area 104 (West Coast), as shown in FIG. 1A. The low demand area 106 constitutes approximately 40 percent of the geographical area of the contiguous United States and the high demand areas 102, 104 constitute approximately 60 percent of the geographical area of the contiguous United States. By eliminating subscriber beam coverage in low demand area 106, all of the available frequency spectrum, both Band A and Band B, may be used to serve subscribers in high demand areas 102 and 104. Assuming that the allocated Band A and Band B have approximately the same bandwidth, the approach effectively doubles the satellite capacity in the high demand areas. In addition, with the total subscriber beam coverage area reduced by 40% by eliminating subscriber beam coverage in low demand area 106, the satellite transmitter power that would have been required to serve low demand area 106 can be redirected toward high demand areas 102 and 104, resulting in only a modest increase in total satellite transmitter power to support twice the total subscriber capacity.

As also disclosed in the ViaSat '051 patent application, the entire frequency spectrum of Band A and Band B is used for the gateway links which are placed in low demand area 106. Since the gateways are located outside of the geographical area of the subscriber beams, where there is no subscriber service, the gateways can reuse the same frequency spectrum, in its entirety, as is used for the subscriber beams. Again, assuming that the allocated Band A and Band B have approximately the same bandwidth, the frequency band of the gateway beams is also doubled using the ViaSat technique. This reduces the total number of gateways required by half and, with only half as many gateways required, the gateways can be placed far enough apart within the low demand area to avoid interference between them. This architecture also reduces the total cost of the gateways by approximately a factor of 2. However, the ViaSat system architecture does not provide service to the low demand area 106, which comprises approximately 40 percent of the geographical area of the United States.

Figure 2:
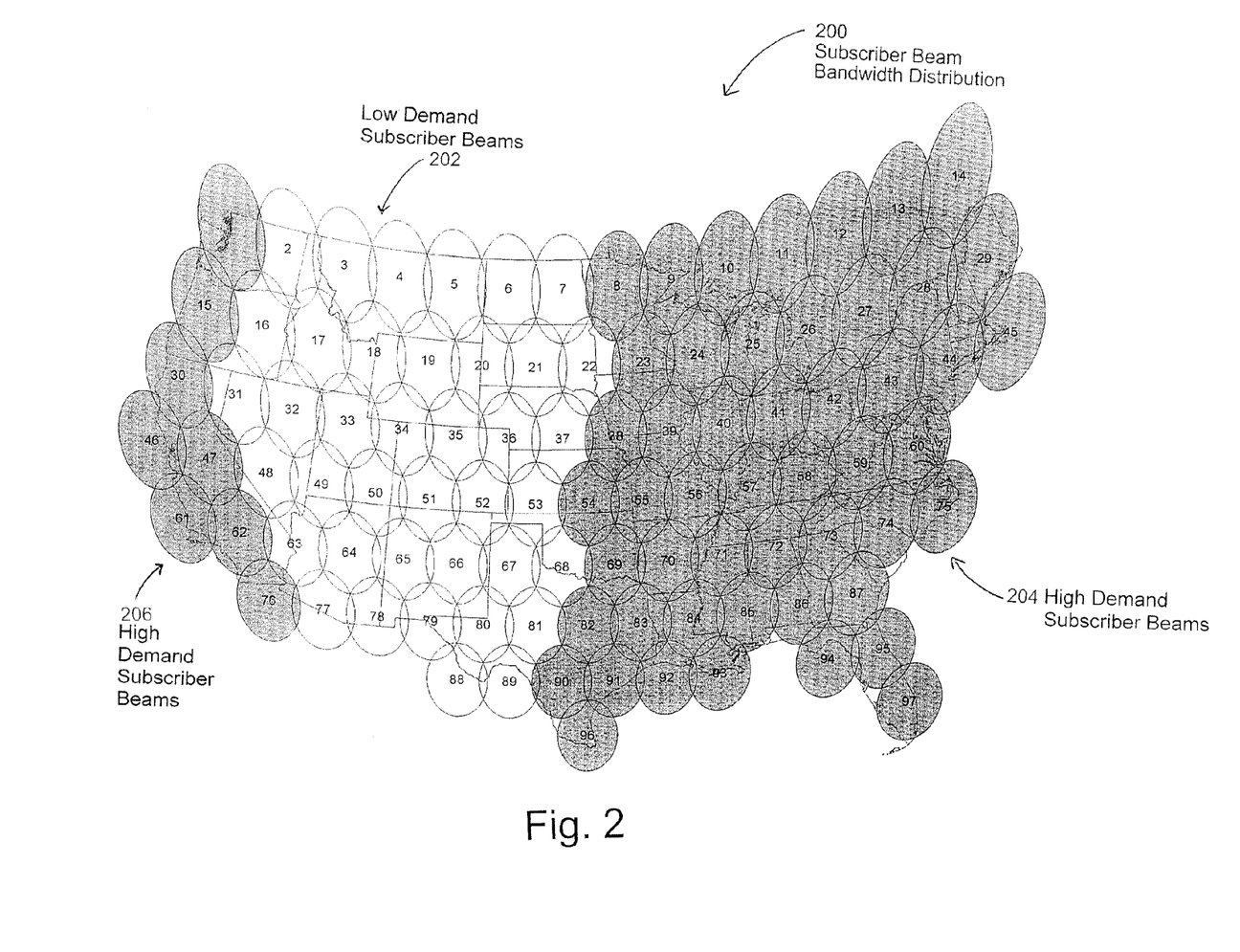
FIG. 2 is a graphical representation of an example of subscriber beam bandwidth distribution that can be utilized by one or more embodiments of the present invention.

To overcome these disadvantages, FIG. 2 illustrates a subscriber beam bandwidth distribution pattern 200 that provides service to the high demand areas 102, 104, as well as the low demand area 106, as illustrated in FIG. 1A. As shown in FIG. 2, a plurality of high demand subscriber beams 204 is used to cover the Eastern part of the United States. Another set of high demand subscriber beams 206 is used to cover the West Coast region. Low demand subscriber beams 202 are used to cover the low demand area 106 that comprises the Western states. In one particular implementation, a new satellite can be positioned in a geostationary at orbit at 89 degrees west longitude to cover the entire 48 contiguous states using a subscriber beam frequency reuse pattern having the 76 beams illustrated in FIG. 2. Each of the demand bandwidth subscriber beams 202 is capable of each serving approximately 10,000 subscribers while each of the high bandwidth subscriber beams 204 is capable of serving approximately 30,000 subscribers. A satellite using this technology can have a net capacity of greater than 1.5 million subscribers.

Figure 3:
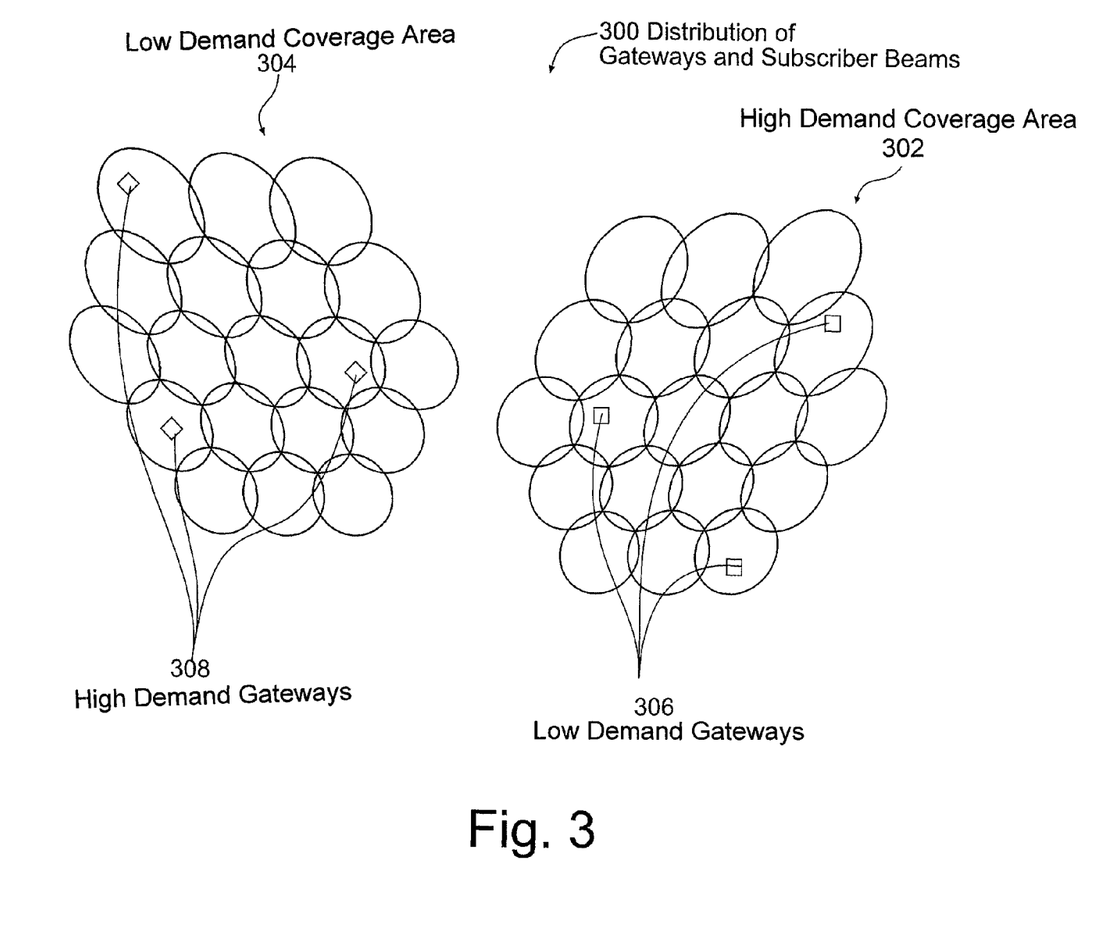
FIG. 3 is a schematic illustration of one embodiment of a distribution of gateways and subscriber beams for low demand coverage areas and high demand coverage areas.

FIG. 3 illustrates an example of a distribution pattern 300 of gateways and subscriber beams that are capable of providing the subscriber beam bandwidth distribution 200, illustrated in FIG. 2. As shown in FIG. 3, the high demand coverage area 302 includes a plurality of subscriber beams, such as high demand subscriber beams 204, illustrated in FIG. 2. Low demand gateways 306 are located in the high demand coverage area 302. The low demand gateways 306 use a different frequency than the high demand subscriber beams so that no interference is created between the signals transmitted between the low demand gateways 306 and the high demand subscriber beams, as disclosed in more detail below. Similarly, the low demand coverage area 304 includes a plurality of low demand subscriber beams, such as low bandwidth subscriber beams 202, illustrated in FIG. 2. Located within the low demand coverage area 304 are a plurality of high demand gateways 308. The high demand gateways 308 use a different frequency than the low demand subscriber beams so that no interference is created, as explained in more detail below.

Figure 4A:
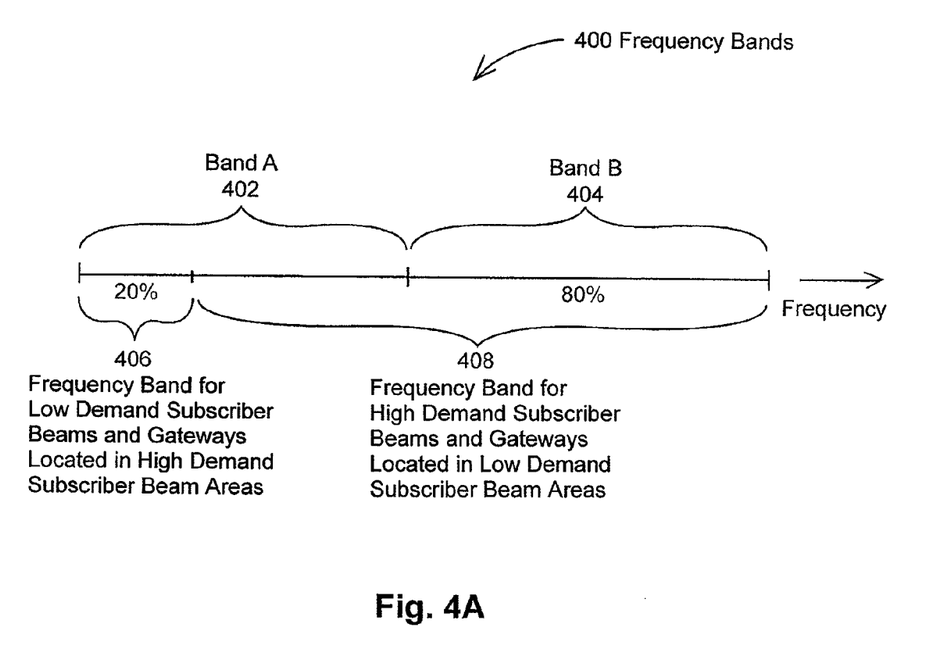
FIG. 4A is a graph illustrating frequency band allocation.

FIG. 4A is a graph 400 illustrating the frequencies of Band A 402 and Band B 404. Band A and Band B are shown as contiguous frequency bands, but may actually be non-contiguous, may be on different polarizations, and may be separated by other frequency bands. As described above, Band A is typically used for subscriber beam communications while Band B is typically used for the gateway communications. As described above with respect to the ViaSat '051 patent application, Band A and Band B are both used for subscriber communications and gateway communications by eliminating service to the low demand area 106, illustrated in FIG. 1 A, and placing the gateways in the low demand area 106 so that the gateways do not interfere with the subscriber beam communications. Rather than completely eliminating service for a particular area and using all of the bandwidth of both Band A and Band B, a portion of the bandwidth can be used for subscriber beams in the low demand area, such as the low demand area 106 of the Western states, illustrated in FIG. 1A.

This percentage of the bandwidth that can be used for the low demand areas can be determined by determining the average demand in those areas compared to the average demand in the high demand areas. For example, if demand for the service in the low demand area 106 (Western states) is one-fourth of the demand in the high demand areas 102 and 104, then 20 percent of the bandwidth 406 of the total frequency spectrum of Band A and Band B can be allocated to the low demand subscriber beams, as illustrated in FIG. 4A. The remaining three-quarters of the bandwidth 408 of the total frequency spectrum can be allocated for the high demand subscriber beams, which is eighty percent of the bandwidth. The frequency band 406, which is 20 percent of the total bandwidth of Band A plus Band B, is used for both the low demand subscriber beams 304 (FIG. 4), as well as the low demand gateways 306 (FIG. 3), which are located in the high population subscriber beam areas. Similarly, the high demand subscriber beams 302 (FIG. 3) use the frequency spectrum 408 and are located in the geographical area of low demand subscriber beams 304 (FIG. 3). Although FIG. 4A illustrates the band 406 that is utilized by the low demand subscriber beams and gateways as the lower portion of the frequency spectrum of Band A and Band B, the frequency band 406 can comprise any contiguous portion, as well as any combination of non-contiguous portions, of the frequencies and polarizations of Band A and Band B. The same is also true for frequency band 408.

Figure 4B:
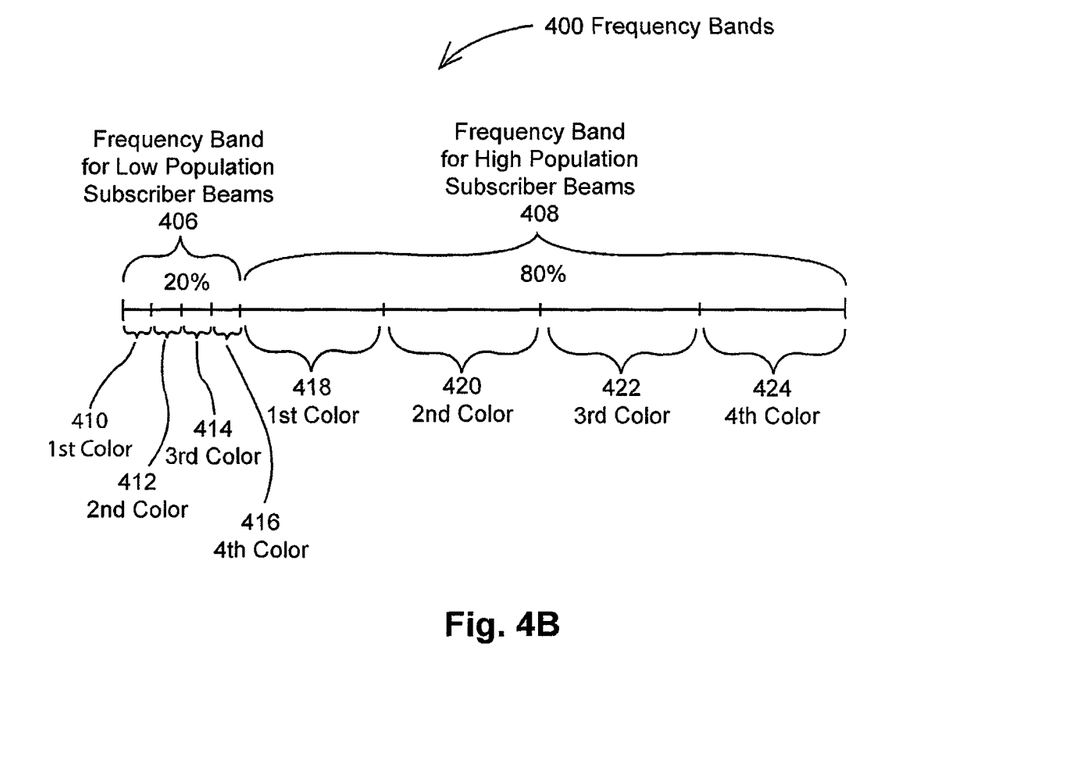
FIG. 4B is an additional graph illustrating frequency band allocation.

FIG. 4B is a graph that is similar to the graph of FIG. 4A, except that FIG. 4B illustrates the four distinct frequency bands (commonly referred to as four "colors") used by the subscriber beams for both frequency band 406 and frequency band 408. As shown in FIG. 4B, frequency band 406 is divided up into four different frequency bands. The four different frequency bands are frequency bands 410 (first color), 412 (second color), 414 (third color) and 416 (fourth color). These frequency bands are assigned to subscriber beams on an alternating basis so that at least one beam separation is provided between subscriber beams in the same band, thereby minimizing interference between subscriber beams. Similarly, frequency band 408 that is used for high population subscriber bands, has four different frequency bands, i.e., frequency bands 418 (first color), 420 (second color), 422 (third color) and 424 (fourth color). As can be seen from FIG. 4B, a substantially greater amount of frequency spectrum is provided in each of the frequency bands 418-424 for the high population subscriber beams, than that provided in frequency bands 410-416, that are used for the low population subscriber beams. The availability of more frequency spectrum within a subscriber beam that covers the same size geographical area results in subscriber beams having a subscriber capacity that increased by the same percentage as the increase in bandwidth allocation. For example, a subscriber beam using the frequency band 410 can only accommodate one-fourth of the number of subscribers as a subscriber band using the frequency band 418, since frequency band 418 has four times the frequency spectrum of frequency band 410.

Figure 5:
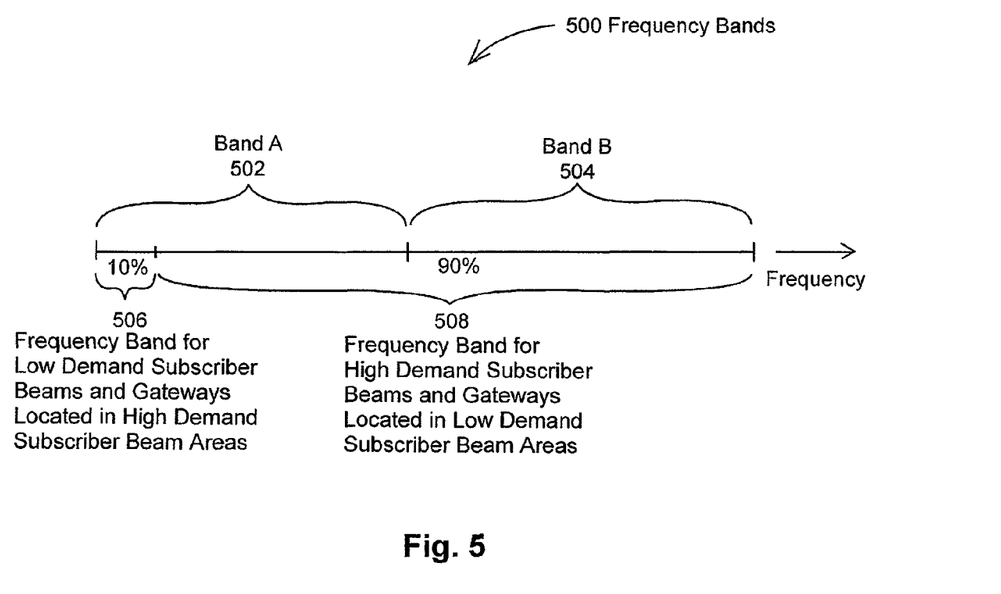
FIG. 5 is a graph of another embodiment of frequency band allocation.

FIG. 5 is an illustration of another embodiment of a way of dividing the frequency bands 500. As shown in FIG. 5, Band A 502 and Band B 504 comprise the total bandwidth that can be used by the satellite system. As shown in FIG. 5, frequency Band 506 is only 10 percent of the total frequency spectrum of Band A 502 plus Band B 504. Frequency band 508 is 90 percent of the frequency spectrum of Band A 502 and Band B 504. Frequency band 506 is used for the low demand subscriber beams and gateways located in the high demand subscriber beam areas. Frequency band 508 is used for the high demand subscriber beams and gateways located in low demand subscriber beam areas. The allocation of bandwidth disclosed in the embodiment of FIG. 5 may be utilized in instances in which demand for the service in the low demand areas is approximately 10 percent of the subscriber demand in the high demand areas. In this manner, nine times the amount of capacity can be provided in the high demand subscriber beams relative to the low demand subscriber beams.

The frequency allocation of 10 percent and 90 percent, illustrated in FIG. 5, is another example of the manner in which the frequency spectrum of Band A and Band B can be divided. Of course, the frequency spectrum can be divided in any desired manner based upon demand in low demand areas compared to high demand areas. In this fashion, satellite systems can be custom designed for geographical areas depending upon demand. In instances in which empirical data is not available, demand can be determined by population and other demographic information regarding a particular region. Further, this technique of allocating bandwidth need not be limited to two demand areas, such as a low demand area and a high demand area. For example, it may be desirable to allocate the frequency spectrum between a low demand area, a medium low demand area, a medium high demand area and a high demand area. Gateways can be located in subscriber beam areas that use frequencies that are different from the frequencies used by the gateway to prevent interference. Any number of divisions can be used to achieve desired results. This manner of allocating bandwidth has advantages over other techniques of using different size beams to cover greater or lesser geographical areas, which results in other inherent inefficiencies.

Figure 6:
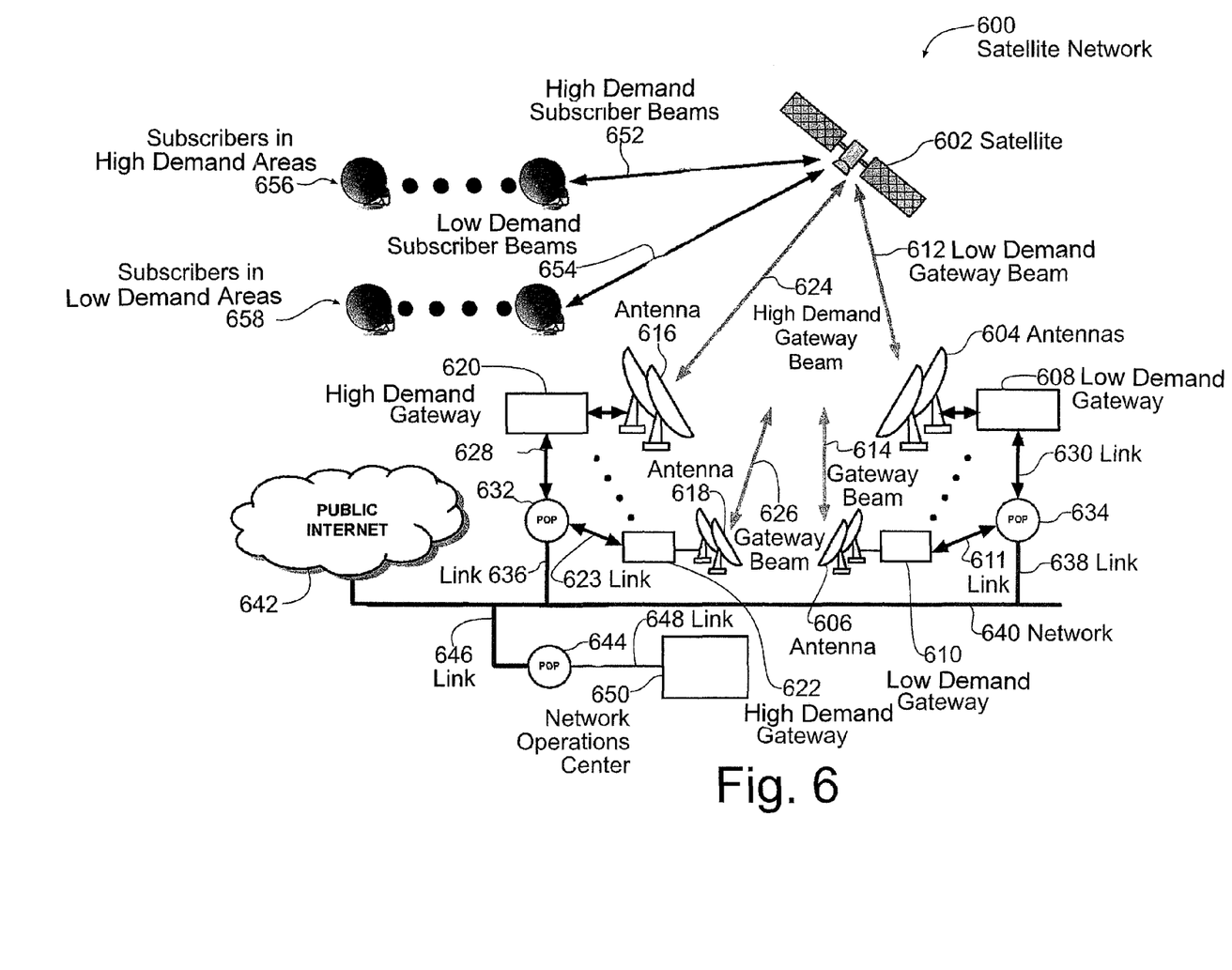
FIG. 6 is a schematic block diagram of one embodiment of a satellite network.

FIG. 6 is a schematic illustration of one embodiment of a satellite network 600. As shown in FIG. 6, satellite network 600 includes a satellite 602 that communicates using high demand subscriber beam 652, low demand subscriber beam 664, high demand gateway beam 624 and low demand gateway beam 612. Low demand gateway beam 612 communicates information between satellite 602 and antenna 604 that are connected to the low demand gateway 608. Low demand gateway 608 communicates through link 630 to point of presence server 634. The point of presence server 634 is linked to network 640, that is connected to the public Internet 642. Low demand gateways 608, 610 are two of a number of low demand gateways, as schematically illustrated in FIG. 6. For example, in one embodiment, eight different low demand gateways, such as low demand gateways 608, 610 are used. Low demand gateway 610 is connected to antenna 606. Satellite 602 communicates with the low demand gateway 610 through gateway beam 614. Low demand gateway 610 is also connected to the POP interface 634 via link 611.

Satellite 602, as shown in FIG. 6, communicates with high demand gateway 620 via antenna 616 and high demand gateway beam 624. A plurality of high demand gateways may be provided. For example, in one embodiment, eleven high demand gateways are provided for communicating with the satellite 602. High demand gateway 622 uses antenna 618 and gateway beam 626 to communicate with satellite 602. High demand gateway 620 is coupled to POP interface 632 via link 628. High demand gateway 622 is coupled to POP interface 632 via link 623. Other high demand gateways are also linked to the POP interface 632. The POP interface 632 is coupled to network 640 by link 636. Network 640 couples the POP interface 632 to the public Internet 642. Network operation center 650, illustrated in FIG. 6, is coupled to a POP interface 644 via link 648. Link 646 couples the POP interface 644 to the network 640. The network 640 allows communication with each of the gateways that are illustrated in FIG. 6.

Satellite 602, illustrated in FIG. 6, also communicates with high demand subscribers 656 via high demand subscriber beam 652. Low demand subscribers 658 communicate with satellite 652 via low demand subscriber beam 654. The bandwidth of the high demand subscriber beam 652 and low demand subscriber beam 654 is allocated in accordance with any desired allocation, such as described above with respect to FIGS. 4A, 4B and 5. High demand subscriber beams 652 use the larger frequency band, such as frequency band 408 illustrated in FIG. 4A, and frequency band 508, illustrated in FIG. 5. Low demand subscriber beams 654 use the smaller frequency bands, such as frequency band 406 illustrated in FIG. 4A, and frequency band 506, illustrated in FIG. 5. Subscribers 656 are located in high demand areas, such as high demand areas 102, 104, illustrated in FIG. 1A. Subscribers 658 are located in low demand areas, such as low demand area 106, illustrated in FIG. 1A. Low demand gateways, such as low demand gateways 608, 610, are physically located in high demand areas, such as high demand areas 102, 104, illustrated in FIG. 1A. The low demand gateways beams, such as low demand gateway beams 612, 614, use reduced or narrower frequency bands, such as frequency band 406, illustrated in FIG. 4A, or frequency band 506, illustrated in FIG. 5. High demand gateways 620, 622 are located in low demand areas, such as low demand area 106, illustrated in FIG. 1A. High demand gateway beams 624, 626 use the frequency bands, such as frequency band 408, illustrated in FIG. 4A, and frequency band 508, illustrated in FIG. 5.

Figure 7:
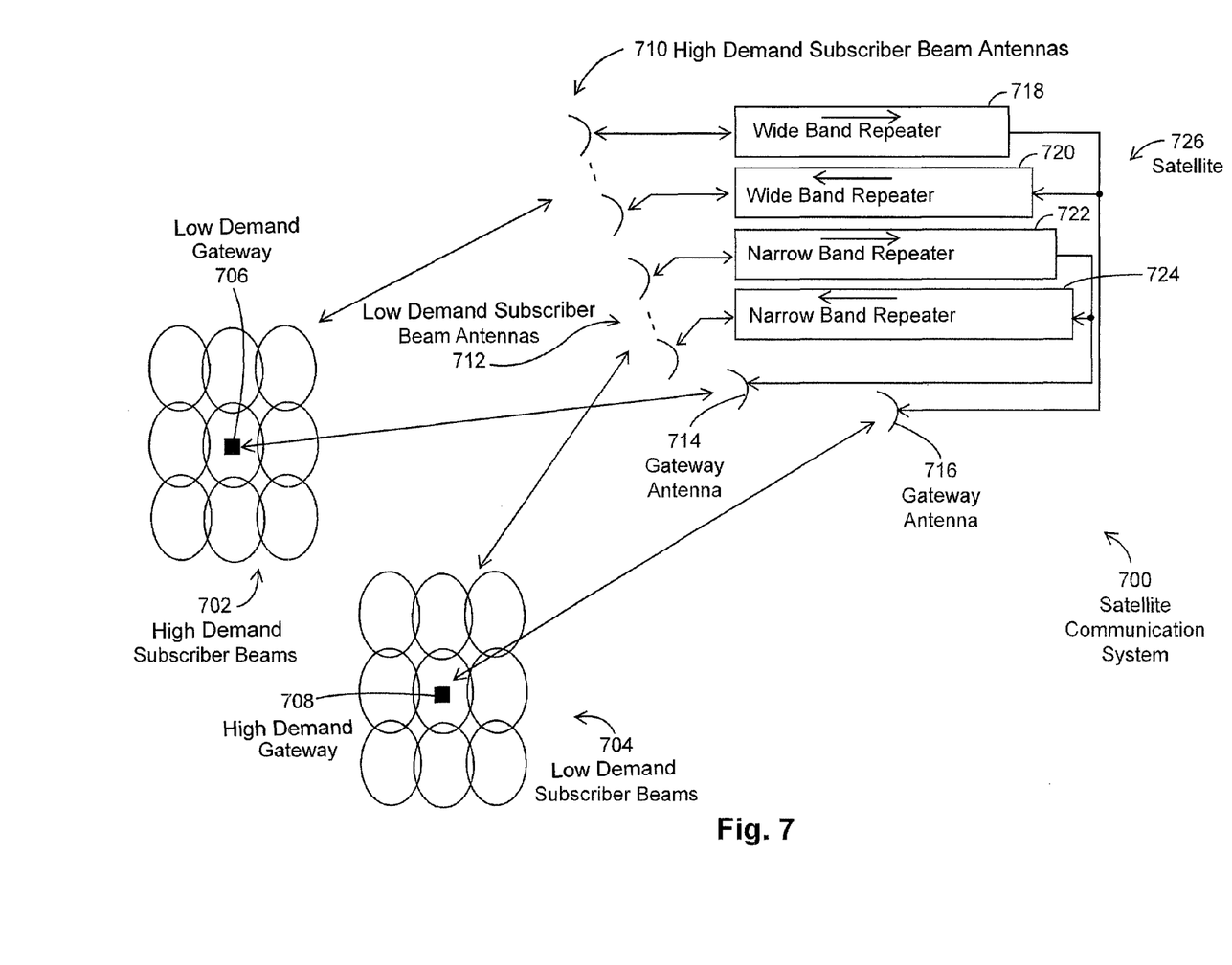
FIG. 7 is another schematic illustration of an embodiment of a satellite communication system.

FIG. 7 is another schematic illustration of an embodiment of a satellite communication system 700. As shown in FIG. 7, the low demand gateway 706 is located within the geographical region of high demand subscriber beam 702. Similarly, the high demand gateway 708 is located within the geographical region of low demand subscriber beam 704. The high demand subscriber beams communicate with the high demand subscriber beam antennas 710 that are located on satellite 726. Information that is transmitted by a subscriber in a high demand subscriber area to the satellite 726 is received by the high demand subscriber beam antennas 710 and transmitted through a wideband return repeater 718, which is connected to a gateway antenna 716 that is located on the satellite 726. The gateway antenna 716 then transmits a gateway signal to the high demand gateway 708. High demand gateway 708 transmits data to the gateway antenna 716, located on the satellite 726, which is sent to the wideband forward repeater 720. Wideband forward repeater 720 then transmits a signal to the high demand subscriber beam antennas 710 that transmit the information from the high demand gateway 708, on the high demand subscriber beam 702, to the subscribers in the high demand subscriber areas.

As also shown in FIG. 7, data from subscribers in low demand subscriber areas is transmitted to the low demand subscriber beam antennas 712 which are located on satellite 726. Information received from subscribers in the low demand subscriber areas is then transmitted through the narrow beam return repeater 722 to gateway antenna 714. Gateway antenna 714 transmits a signal to the low demand gateway 706 that is located in the geographical region of the high demand subscriber beam 702. Information from the low demand gateway 706 is transmitted from the low demand gateway 706 to gateway antenna 714. This information is transmitted through the narrow band forward repeater 724 to the low demand subscriber beam antenna 712. Low demand subscriber beam antenna 712 transmits a signal via the low demand subscriber beam 704 to the subscribers in the low demand subscriber area. The wide band repeaters 718, 720, as well as the narrow band repeaters 722, 724, are specifically constructed to receive and transmit information in accordance with the frequencies and the allocated bandwidth described in FIGS. 4A, 4B and 5.

Hence, a satellite communication system is described in which bandwidth can be allocated in accordance with demand in certain geographical areas, which optimizes the efficiency and capacity of a communication system. The communication system can be custom built to accommodate various geographical regions, demand distribution and demand percentages. High efficiency and high capacity of the allocated bandwidth are provided while simultaneously providing coverage for all geographical regions.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing satellite communication services using an allocated frequency spectrum having a predetermined bandwidth in a satellite communication system that has multiple beams covering high demand areas and low demand areas, comprising:

allocating a first percentage of said predetermined bandwidth as a low demand frequency spectrum for use in low demand subscriber beams and low demand gateway beams so that said low demand areas are provided with a low demand subscriber capacity that corresponds to said first percentage of said predetermined bandwidth allocated as said low demand frequency spectrum;

allocating a second percentage of said predetermined bandwidth as a high demand frequency spectrum for use in high demand subscriber beams and high demand gateway beams so that said high demand areas are provided with a high demand subscriber capacity that corresponds to said second percentage of said predetermined bandwidth allocated as said high demand frequency spectrum, said high demand frequency spectrum being different from said low demand frequency spectrum, wherein said first percentage and said second percentage of said predetermined bandwidth are determined based on a demand for service in said low demand areas compared to a demand for service in said high demand areas;

directing said low demand subscriber beams to said low demand areas;

directing said high demand subscriber beams to said high demand areas;

directing said low demand gateway beams to low demand gateways located in said high demand areas such that said low demand gateway beams are not in the same geographical area as said low demand subscriber beams, said low demand gateway beams utilizing a same portion of said low demand frequency spectrum as said low demand subscriber beams; and directing said high demand gateway beams to high demand gateways located in said low demand areas such that said high demand gateway beams are not in the same geographical area as said high demand subscriber beams, said high demand gateway beams utilizing a same portion of said high demand frequency spectrum as said high demand subscriber beams.

2. The method of claim 1 further comprising:
allocating an additional percentage of said predetermined bandwidth as additional subscriber beam spectra and additional gateway beam spectra for use by additional subscriber beams and by additional gateway beams so that additional demand areas are provided with additional subscriber capacity that corresponds to said additional percentage of said predetermined bandwidth that are allocated to said additional subscriber beam spectra and said additional gateway beam spectra;
directing said additional subscriber beams to said additional demand areas so that said additional subscriber beam spectra and said additional gateway beam spectra are not used in the same geographical area, which reduces interference.

3. The method of claim 1 further comprising:
determining said high demand areas and said low demand areas from empirical data.

4. The method of claim 1 further comprising:
determining said high demand areas and said low demand areas from demographic data.

5. The method of claim 1 wherein said first percentage and said second percentage comprise substantially all of said predetermined bandwidth of said allocated frequency spectrum.

6. The method of claim 2 wherein said first percentage, said second percentage and said additional percentage of said predetermined bandwidth comprise substantially all of said predetermined bandwidth of said allocated frequency spectrum.

7. The method of claim 1 wherein said allocated frequency spectrum is non-contiguous.

8. The method of claim 7 wherein said low demand frequency spectrum is non-contiguous.

9. The method of claim 7 wherein said high demand frequency spectrum is non-contiguous.

10. The method of claim 1 wherein said low demand frequency spectrum and said high demand frequency spectrum are non-contiguous.

11. The method of claim 1 wherein said allocated frequency spectrum has multiple polarizations.

12. The method of claim 1 wherein said low demand frequency spectrum has multiple polarizations.

13. The method of claim 1 wherein said high demand frequency spectrum has multiple polarizations.

14. The method of claim 1 wherein said low demand frequency spectrum and said high demand frequency spectrum have multiple polarizations.

15. A satellite communication system using an allocated frequency spectrum having a predetermined bandwidth that provides satellite communication services to high demand areas and low demand areas comprising:
a plurality of low demand subscriber beam antennas that direct low demand subscriber beams to low demand geographical areas, said low demand subscriber beams using a low demand frequency spectrum which is a first percentage of said predetermined bandwidth;
a plurality of high demand subscriber beam antennas that direct high demand subscriber beams to high demand geographical areas, said high demand subscriber beams using a high demand frequency spectrum which is a second percentage of said predetermined bandwidth, said high demand frequency spectrum being different from said low demand frequency spectrum, wherein said first percentage and said second percentage of said predetermined bandwidth are determined based on a demand for service in said low demand areas compared to a demand for service in said high demand areas;
at least one low demand gateway beam antenna that directs a low demand gateway beam to a low demand gateway located in said high demand geographical areas to reduce interference between said low demand gateway beam, using said low demand frequency spectrum, and said high demand subscriber beams, using said high demand frequency spectrum, said low demand gateway beam utilizing a same portion of said low demand frequency spectrum as said low demand subscriber beams, wherein said low demand gateway beam is not in the same geographical area as said low demand subscriber beams; and
at least one high demand gateway beam antenna that directs a high demand gateway beam to a high demand gateway that is located in said low demand geographical areas to reduce interference between said high demand gateway beam, using said high demand frequency spectrum, and said low demand subscriber beams, using said low demand frequency spectrum, said high demand gateway beam utilizing a same portion of said high demand frequency spectrum as said high demand subscriber beams, wherein said high demand gateway beam is not in the same geographical area as said high demand subscriber beams.

16. The satellite communication system of claim 15 further comprising:
a plurality of additional subscriber beam antennas that direct additional subscriber beams to additional geographical areas, said additional subscriber beams using additional subscriber beam spectra which comprises an additional percentage of said predetermined bandwidth of said allocated frequency spectrum;
a plurality of additional gateway beam antennas that direct additional gateway beams to additional gateways that are located in said additional geographical areas, said additional gateway beams using additional gateway beam spectra that are different from said additional subscriber beam spectra in each geographical area of said additional geographical areas.

17. The satellite communication system of claim 15 wherein said high demand areas and said low demand areas are selected using empirical data.

18. The satellite communication system of claim 15 wherein said high demand areas and said low demand areas are selected using demographic data.

19. The satellite communication system of claim 15 wherein said first percentage and said second percentage of said predetermined bandwidth of said allocated frequency spectrum comprise substantially all of said predetermined bandwidth of said allocated frequency spectrum.

20. The satellite communication system of claim 16 wherein said first percentage, said second percentage and said additional percentage of said predetermined bandwidth of said allocated frequency spectrum comprise substantially all of said predetermined bandwidth of said allocated frequency spectrum.

21. The satellite communication system of claim 15 wherein said allocated frequency spectrum is non-contiguous.

22. The satellite communication system of claim 15 wherein said low demand frequency spectrum is non-contiguous.

23. The satellite communication system of claim 15 wherein said high demand frequency spectrum is non-contiguous.

24. The satellite communication system of claim 15 wherein said allocated frequency spectrum has multiple polarizations.

25. The satellite communication system of claim 15 wherein said low demand frequency spectrum has multiple polarizations.

26. The satellite communication system of claim 15 wherein said high demand frequency spectrum has multiple polarizations.

27. The method of claim 1 wherein said demand for service in said low demand areas and said demand for service in said high demand areas are determined based on at least one of empirical demand data of said low demand areas and said high demand areas, demographic information of said low demand areas and said high demand areas, or a combination thereof.

28. The method of claim 27 wherein said demand for service in said low demand areas and said demand for service in said high demand areas are determined based on averages of said empirical demand data of said low demand areas and said high demand areas.

29. The method of claim 27 wherein said demographic information of said low demand areas and said high demand areas comprises population information of said low demand areas and said high demand areas.

30. The satellite communication system of claim 15 wherein said demand for service in said low demand areas and said demand for service in said high demand areas are determined based on at least one of empirical demand data of said low demand areas and said high demand areas, demographic information of said low demand areas and said high demand areas, or a combination thereof.

31. The satellite communication system of claim 30 wherein said demand for service in said low demand areas and said demand for service in said high demand areas are determined based on averages of said empirical demand data of said low demand areas and said high demand areas.

32. The satellite communication system of claim 30 wherein said demographic information of said low demand areas and said high demand areas comprises population information of said low demand areas and said high demand areas.

\* \* \* \* \*